No. 611,912. Patented Oct. 4, 1898.
S. H. JONES & J. A. CARR.
GRAIN DRILL.
(Application filed June 13, 1898.)
(No Model.) 2 Sheets—Sheet 1.
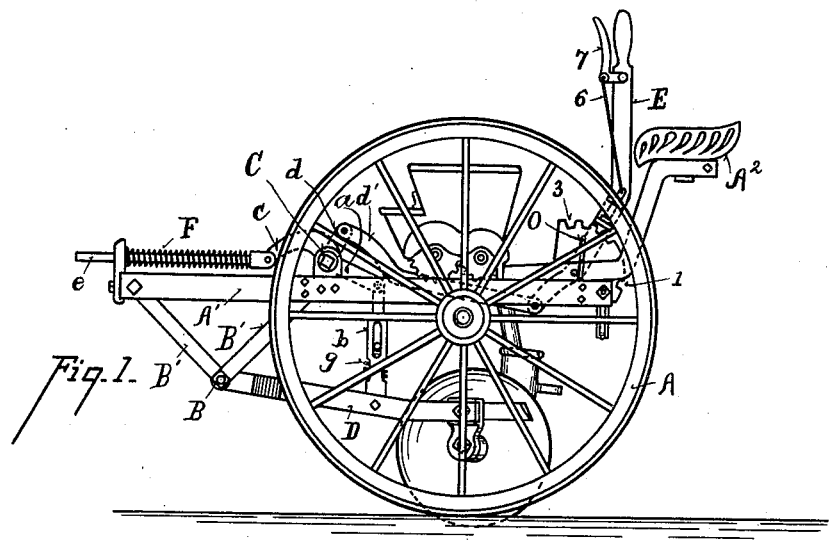
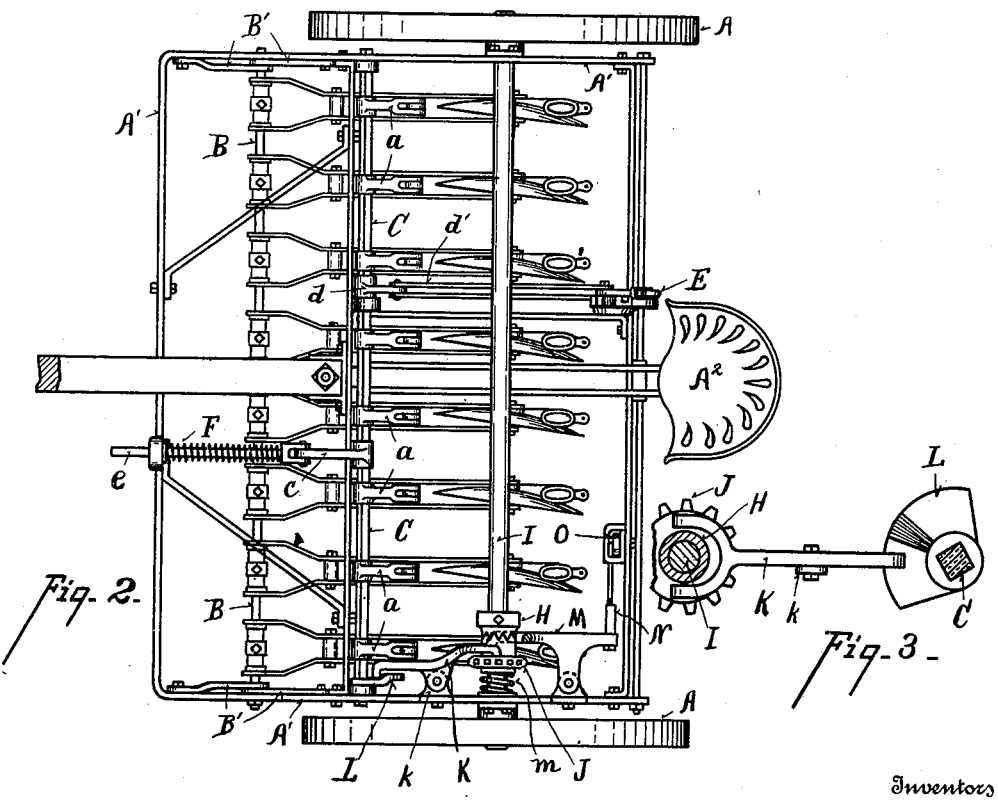
Witnesses
Inventors
S. H. Jones & J. A. Carr
Attorneys

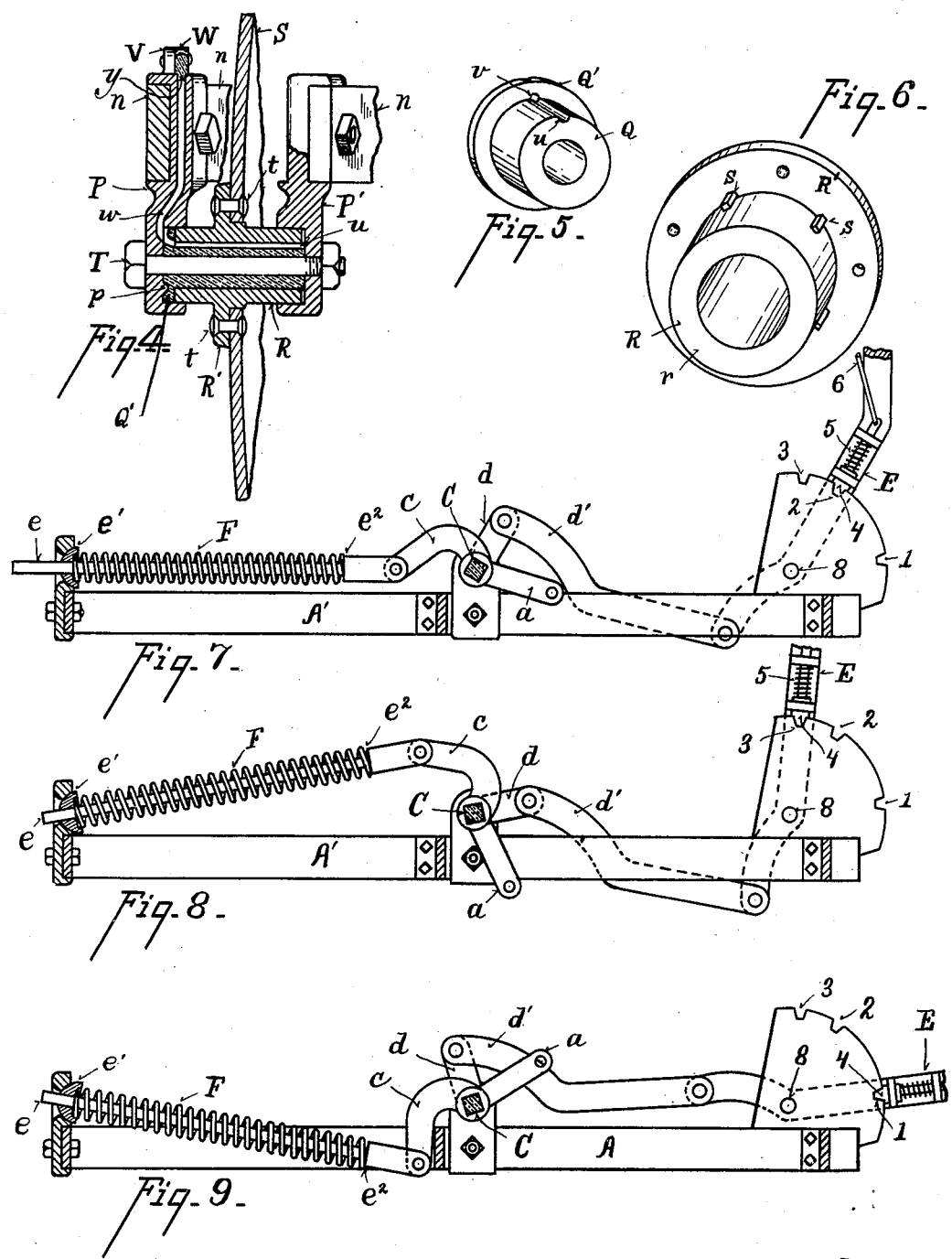

UNITED STATES PATENT OFFICE.

SYLVESTER H. JONES AND JAMES A. CARR, OF RICHMOND, INDIANA, ASSIGNORS TO THE HOOSIER DRILL COMPANY, OF SAME PLACE.

GRAIN-DRILL.

SPECIFICATION forming part of Letters Patent No. 611,912, dated October 4, 1898.

Application filed June 13, 1898. Serial No. 683,346. (No model.)

*To all whom it may concern:*

Be it known that we, SYLVESTER H. JONES and JAMES A. CARR, residing at Richmond, in the county of Wayne and State of Indiana, have invented certain new and useful Improvements in Grain-Drills, of which the following is a specification.

One of the objects of our invention is to provide one or more springs applied to the disk-controlling rock-bar, arranged so that when the disks are let down on the ground the weight of the disks and drag-bars compresses the spring and stores up power which assists in raising the disks and drag-bars. Another result is also accomplished by the use of said springs. They cushion the drag-bars and disks in their descent and prevent shocks or jars when the disks reach the ground.

Another object of our invention is to so combine the disk-controlling bar and the spring that they may be adjusted so as to have the spring double-acting and apply pressure at will, through the spring, upon the drag-bars to assist in forcing the disks into the ground.

Another object of our invention is to provide means for throwing the feed mechanism in and out of gear automatically by the raising and lowering of the furrow-opening disks, in combination with a lever for operating the same by hand.

Another object of our invention is to provide improved bearing for hangers for the disks, which enable them to be made of chilled metal, thereby obtaining more durable and better bearing-surfaces, the parts being so constructed that they are easily lubricated.

The features of our invention will be more fully set forth in the description of the accompanying drawings, making a part of this specification, in which—

Figure 1 is a side elevation of our improvement. Fig. 2 is a top plan view with seedbox removed. Fig. 3 is a detailed view of the shipping mechanism. Fig. 4 is a central vertical section of one of the disks and hangers. Fig. 5 is a perspective view of the stub-shaft. Fig. 6 is a perspective view of the journal-sleeve. Fig. 7 is a longitudinal section, partly in elevation, of the spring-controlling mechanism, showing the parts in position when the drag-bars are lowered. Fig. 8 is a similar view showing the position of the parts when the drag-bars are receiving spring-pressure to force the disks into the ground. Fig. 9 is a similar view showing the position when the drag-bars are raised.

A represents the supporting-wheels; A', the frame; $A^2$, the seat.

B represents the rod on which the drag-bars are supported and journaled. This draw-rod is supported by brackets B', depending from the frame.

C represents a rock-shaft to which are secured the cranks controlling the operation of the springs and the drag-bars. Cranks $a$ form the supports for the standards $b$, which are severally attached to the drag-bars D and control their operation.

$c$ represents the spring-controlling crank.

$d$ represents the crank to which the link $d'$ of the operating-lever E is hinged at one end, the forward end of said link being hinged to the crank $d$.

F represents a compensating spring. It is coiled around the rod $e$. $e'$ represents the forward seat of said spring F. $e^2$ represents the rear seat of said spring.

The operating-lever E is journaled to a quadrant. This quadrant is provided with notches 1, 2, and 3.

4 represents a locking-dog; 5, a spring for forcing the same into the notches; 6, a link, and 7 a lock-lever for releasing the dog. The spring 5 automatically controls the engagement of the dog with the several notches when the lever E is oscillated on its axis 8. The movement of this lever E operates the rock-bar C and controls the operation of the compensating spring through the crank $c$ and the raising and lowering of the several drag-bars through the operation of the several cranks $a$, to which the standards $b$ of the several drag-bars are attached.

Mode of operation of the compensating spring: The position of the several cranks of the rock-shaft C when the drag-bars are elevated and the position of this compensating spring are shown in Fig. 9, the crank-arms $a$ being in their uppermost position. The compensating spring is partially compressed in this position, so as to obtain more power by the further compression. When it is desired to lower the drag-bars and their attached disks, the lock-dog of lever E is released and the lever raised until the lock-dog engages with notch 2. This brings the disks down to the ground, and the parts are brought into the position shown in Fig. 7. The weight of the drag-bars and disks compresses the spring F. If, now, it is desired to release the drag-bars, the locking-lever E is released, and the spring F, acting through the crank c, gives out its stored-up power and assists in rocking shaft C, and hence aids materially in lifting the drag-bars. We have found by experience that the spring may be made strong enough to do the major portion of lifting the drag-bars.

It is desirable at times to employ the spring to assist in forcing the disks into the ground. When this work is to be accomplished, the operating-lever is moved into the position shown in Fig. 8. The spring F being partially compressed exerts pressure through crank c upon rock-shaft C, and thence upon the crank-arms a, forcing the standard b and the drag-bars D downward.

We believe we are the first to control or to assist in controlling a series of drag-bars by means of one or more compensation-springs. We have shown but one such spring; but it is obvious that two or more can be used, if desired.

The several standards b may be individually controlled by springs g, which allow the drag-bars to rise independently to pass over an obstacle. This improvement can be applied to a hoe as well as a disk drill.

It is desirable to throw the machine into gear when the drag-bars are lowered and to unship the seeding-gear when the drag-bars are raised, thus throwing the machine in and out of gear automatically. To accomplish this result, the following means are provided:

H represents a clutch, one member of which is rigidly connected to the revolving axle I and the other member is moved by a shipping-lever. The seeding mechanism is not shown; but any well-known positive feed is employed. Motion is primarily transmitted through the sprocket-wheel J, which is provided with a sleeve the end of which is serrated to engage with the serrations of the fixed clutch member.

K represents the shipping-lever, which is of ordinary construction. It is pivoted to the bracket k to the side frame of the machine.

L represents a cam mounted upon the rock-shaft C, which the free end of the shipping-lever engages. This cam is inclined, and the parts are so adjusted that as the drag-bars are raised the sprocket-wheel and its clutch member are moved out of engagement with the fixed clutch member by the movement of lever K, operated by the cam on the rock-shaft.

m represents a coil-spring surrounding the axle and seating against the hub of the sprocket-wheel and against the frame of the machine. The spring is so adjusted that when the drag-bars are let down it forces the sprocket-wheel J and its moving clutch member to move laterally on the shaft I and engage the fixed clutch member. It is desirable also to throw the clutch in and out of gear by hand. This is accomplished by means of the oscillating arm M, link N, and a hand-lever O connected thereto. The spring m throws the clutch into gear, and the lever O, pivoted to the link N, is moved to throw the clutch out of gear.

In the employment of disks for a furrow-opener considerable strain and wear is imposed upon the bearings and their support, and it is desirable to make them strong and durable. This is accomplished in the following manner:

P P' represent the hangers, which are attached to the rear ends n n' of the drag-bars, as shown in Fig. 4. The lower ends of these hangers are provided with annular sockets. Q represents a sleeve provided with a head or flange Q'. These surfaces are cast in a chill. The head Q' is provided with a recess p, into which projects a lug cast on the inner face of the annular socket, so as to lock the sleeve to the hanger P and prevent the sleeve Q from revolving.

R represents a sleeve which fits and journals upon the sleeve Q. The end r of the sleeve R bears against the annular flange of the head Q'. This flange receives the thrusts of the angularly-inclined disk S, which is rigidly attached to the flange R', made integral with the sleeve R.

s represents lugs on the sleeve R, which fit into corresponding-shaped notches of the perforated disks S. t represents bolts for rigidly attaching said disks to the flanges R'.

T represents a bolt for clamping the hangers P P' against the end of sleeve R. By constructing the bearings of this double sleeve in the form and manner shown they require but little fitting, and the bearing-surfaces may be cast in a chill or a semichill, and thus obtain more durable bearing-surfaces.

It is desirable also to keep the bearing-surfaces lubricated. To accomplish this, the sleeve Q is provided with a groove u.

v represents an orifice pierced through the flange Q' and communicating with a passage w, formed in the hanger P.

W represents a cap-arm hinged to the ear V. This cap is provided with a lug y, which normally rests in the mouth of the passage w, closing it against the entrance of dirt. To lubricate the bearings of each particular disk, it is only necessary to raise cap W and pour oil into the passage w.

Having described our invention, what we claim is—

1. In a grain-drill, in combination with the drag-bars, the rock-shaft having crank connections with the drag-bar and one or more compensating springs having a crank connection with said rock-shaft, substantially as specified.

2. In a grain-drill employing drag-bars having standard and crank connections with a rock-shaft, the combination with said rock-shaft of a crank and a compensating spring, and an operating-lever also having crank connections with said rock-shaft, substantially as specified.

3. In a grain-drill, the combination of a rock-shaft journaled on the frame thereof, a plurality of cranks fixed on said rock-shaft and each connected to one of the drag-bars, a hand-lever for rocking the rock-shaft, and a compensating spring arranged to aid in rocking the rock-shaft to raise and lower the drag-bars, substantially as described.

4. In a grain-drill, in combination with a rock-shaft journaled upon the frame of the drill, a series of crank-arms connecting the drag-bars to said rock-shaft, a crank connecting said rock-shaft with a compensating spring F, an operating-lever having link connections with crank $d$ of said rock-shaft, and locking mechanism applied to said operating-lever, for locking the controlling rock-shaft in different positions, substantially as specified.

5. In combination with the axle of a grain-drill, a stationary clutch member mounted thereon, a movable clutch member carrying a transmitting-gear loosely mounted on said axle, the retractile spring $m$ coiled about said axle, the oscillating arm M and lever O, substantially as specified.

6. In a grain-drill employing one or more furrow-opening disks, supported upon drag-bars, hangers provided with annular recesses and connected to said drag-bars, a sleeve-shaft provided with a head seating in and engaging the recess of one of said hangers, a sleeve secured to said disk and journaling upon said sleeve-shaft and within the recesses of the hangers, substantially as specified.

7. In a grain-drill, the combination with the disk-hangers, of the sleeve Q clamped between said hangers and provided at one end with a flange Q', said sleeve being provided on its periphery with a longitudinal groove $u$ and said flange having a perforation $v$ opposite said groove, an oil-feed duct $w$ formed in one of said hangers and registering at its lower end with the perforation $v$, a sleeve R journaled on the sleeve Q, and a disk fixed on the sleeve R, substantially as described.

8. In a grain-drill employing one or more furrow-opening disks supported upon drag-bars, hangers connected to said drag-bars, one of which is provided with an oil-passage $w$ communicating with the passage $v$ pierced through the flange Q' and communicating with a recess $u$ formed in sleeve Q, substantially as specified.

In testimony whereof we have hereunto set our hands.

SYLVESTER H. JONES.
JAMES A. CARR.

Witnesses:
E. J. MORGAN,
HERBERT J. FARMER.